United States Patent [19]

Salpaka et al.

[11] Patent Number: 5,553,873
[45] Date of Patent: Sep. 10, 1996

[54] KEYLESS CHUCK

[75] Inventors: Glenn L. Salpaka, Salem; Valerie D. Owens, Townville; Willie C. Mullinax, Central, all of S.C.

[73] Assignee: Power Tool Holders Incorporated, Wilmington, Del.

[21] Appl. No.: 269,553

[22] Filed: Jul. 1, 1994

[51] Int. Cl.$^6$ .................................................. B23B 31/12
[52] U.S. Cl. .................................... 279/62; 279/902
[58] Field of Search ............................... 279/60–65, 902, 279/142–145

[56] References Cited

U.S. PATENT DOCUMENTS

| | | |
|---|---|---|
| D. 332,209 | 1/1993 | Feigel . |
| 911,012 | 1/1909 | Jacobs . |
| 913,059 | 2/1909 | Savage . |
| 1,123,541 | 1/1915 | Jacobs . |
| 1,417,981 | 5/1922 | Englund . |
| 1,476,903 | 12/1923 | McConnell . |
| 1,773,034 | 8/1930 | Englund . |
| 1,784,002 | 12/1930 | Englund . |
| 1,970,056 | 8/1934 | O'Flaherty . |
| 2,292,470 | 8/1942 | Östberg . |
| 2,684,856 | 7/1954 | Stoner . |
| 3,807,745 | 4/1974 | Bent . |
| 4,170,366 | 10/1979 | Alessio . |
| 4,252,333 | 2/1981 | Vogel . |
| 4,275,893 | 6/1981 | Bilanceri . |
| 4,305,597 | 12/1981 | McCarty . |
| 4,381,116 | 4/1983 | Futter . |
| 4,423,881 | 1/1984 | Whitehead . |
| 4,648,608 | 3/1987 | Smith . |
| 4,660,841 | 4/1987 | Chouinard . |
| 4,682,918 | 7/1987 | Palm . |
| 4,695,065 | 9/1987 | Komatsu et al. . |
| 4,817,971 | 4/1989 | Flynn . |
| 4,836,563 | 6/1989 | Röhm . |
| 4,840,387 | 6/1989 | McCarthy . |
| 4,842,288 | 6/1989 | Ando . |
| 4,848,779 | 7/1989 | Wheeler et al. . |
| 4,951,955 | 8/1990 | Sakamaki . |
| 4,991,860 | 2/1991 | Röhm . |
| 5,009,439 | 4/1991 | Sakamaki . |
| 5,031,925 | 7/1991 | Tatsu et al. . |
| 5,044,643 | 9/1991 | Nakamura . |
| 5,125,673 | 6/1992 | Huff et al. . |
| 5,145,192 | 9/1992 | Röhm . |

(List continued on next page.)

FOREIGN PATENT DOCUMENTS

| | | | |
|---|---|---|---|
| 0043785A1 | 1/1982 | European Pat. Off. . | |
| 0340310A1 | 4/1989 | European Pat. Off. . | |
| 0433187A1 | 12/1990 | European Pat. Off. . | |
| 0618029A1 | 10/1994 | European Pat. Off. . | |
| 2606691 | 5/1988 | France . | |
| 3411127 | 10/1985 | Germany | 279/62 |
| 3439668A1 | 4/1986 | Germany . | |
| 4023304C1 | 9/1991 | Germany . | |
| G9320006.4 | 3/1994 | Germany . | |
| 63-216604 | 9/1988 | Japan . | |
| 401027804A | 1/1989 | Japan . | |
| 0092009 | 4/1989 | Japan . | |
| 405038608 | 2/1993 | Japan | 279/62 |
| 1330065 | 9/1973 | United Kingdom . | |
| 1565048 | 4/1980 | United Kingdom . | |
| WO8903267 | 4/1989 | WIPO . | |
| WO9112914 | 9/1991 | WIPO . | |

OTHER PUBLICATIONS

Yukiwa Products Brochure.
Bosch Catalog No. 890,021; Sep., 1990; pp. 15 and 17 SDS Rotary Hammers And Accessories Specifications.

*Primary Examiner*—Steven C. Bishop
*Attorney, Agent, or Firm*—Dority & Manning

[57] ABSTRACT

A three-jaw chuck is provided with a unitary nut rotatably mounted relative to the body and a retaining member located so as to contact a portion of the unitary nut to prevent axial movement of the nut in the forward direction. The nut may include a first portion of a first outside diameter and a second portion extending axially outward from the first portion with an outside diameter less than the first outside diameter. A sleeve retaining snap ring may be provided engaging the sleeve for retaining the sleeve on the body.

34 Claims, 5 Drawing Sheets

U.S. PATENT DOCUMENTS

| | | | |
|---|---|---|---|
| 5,145,193 | 9/1992 | Rohm | 279/140 |
| 5,158,306 | 10/1992 | Röhm . | |
| 5,183,274 | 2/1993 | Sakamaki . | |
| 5,193,824 | 3/1993 | Salpaka | 279/144 |
| 5,215,317 | 6/1993 | Jordan et al. . | |
| 5,234,223 | 8/1993 | Sakamaki . | |
| 5,253,879 | 10/1993 | Huff et al. . | |
| 5,330,204 | 7/1994 | Huff et al. . | |
| 5,348,317 | 9/1994 | Steadings et al. . | |
| 5,348,318 | 9/1994 | Steadings et al. . | |
| 5,390,940 | 2/1995 | Morlino et al. | 279/62 |
| 5,431,420 | 7/1995 | Huff et al. . | |
| 5,452,906 | 9/1995 | Huff et al. . | |

KEYLESS CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools of such drivers, the tools may also comprise screwdrivers, nut drivers, burrs, mounted grinding stones, and other cutting or abrading tools. Since the tools may have shanks of varying diameter or the cross section of the tool shank may be polygonal, the device is usually provided with a chuck which is adjustable over a relatively wide range. The chuck may be attached to the driver by a threaded or tapered bore.

A variety of chucks have been developed in the art. In the simplest form of chuck, three jaws spaced circumferentially approximately 120° apart from each other are constrained by angularly disposed passageways in a body attached onto the drive shaft of a driver and configured so that rotation of the body in one direction with respect to a constrained nut engaging the jaws forces the jaws into gripping relationship with the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-impact Keyless Chuck," commonly assigned to the present assignee, and whose entire disclosure is incorporated by reference herein.

Despite the success of keyless of chucks such as set forth in U.S. Pat. No. 5,125,673, varying configurations of keyless chucks are desirable for a variety of applications.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide an improved chuck utilizing a unitary nut.

It is another object of the present invention to provide a keyless chuck with an improved front sleeve retaining member.

It is another object of the present invention to provide a keyless chuck that provides for efficient assembly.

These and other objects are achieved by providing a chuck for use with a manual or powered driver having a rotatable drive shaft, the chuck including a generally cylindrical body member, the body member having a forward section and rearward section. The rearward section has an axial bore formed therein to mate with the drive shaft of the driver and the forward section has an axial bore formed therein and a plurality of angularly disposed passageways formed therethrough and intersecting the axial bore. A plurality of jaws are provided slidably positioned in each of the angularly disposed passageways, each of the jaws having a jaw face formed on one side thereon and threads formed on the opposite side. A unitary nut is provided rotatably mounted relative to the body so as to engage the jaw threads and a retaining member is located on the body member, the retaining member being located so as to contact a portion of the unitary nut to prevent axial movement of the nut in the forward direction. A generally cylindrical sleeve member is also provided received over the forward section of the body for engaging the nut so that when the sleeve member is rotated, the nut will be rotated therewith to operate the jaws. In one preferred embodiment, the nut includes a first portion of a first outside diameter and a second portion extending axially outward from the first portion with the second portion having an outside diameter less than the first outside diameter. In addition, in an preferred embodiment, a sleeve retaining snap ring is received on the body member engaging the sleeve for retaining the sleeve on the body member.

These and other objects are so achieved by providing a chuck with use with a manual or powered driver having a rotatable drive shaft, the chuck comprising a generally cylindrical body member, the body member having a forward section and a rearward section, the rearward section having an axial bore formed therein to mate with the drive shaft of the driver and the forward section having an axial bore formed therein with a plurality of angularly disposed passageways formed therethrough and intersecting the axial bore. A plurality of jaws are also provided slidably positioned in each of the angularly disposed passageways, each of the jaws having a jaw face formed on one side thereof and threads formed on the opposite side. A generally cylindrical sleeve member is also provided received over the forward section of the body, the sleeve member including a unitary nut retained therein so that when the sleeve is rotated, the nut will rotate therewith, the sleeve and nut being mounted relative to the body to engage the jaw threads. The sleeve member further includes a bearing member retained in the forward section of the sleeve member and adapted to engage the forward section of the body member, the bearing member serving as a thrust bearing.

These and other objects are also achieved by providing a chuck for use with a manual or powered driver having a rotatable drive shaft, the chuck comprising a generally cylindrical body member, the body member having a forward section and a rearward section. The rearward section has an axial bore formed therein to mate with the drive shaft of the driver and the forward section has an axial bore formed therein and a plurality of angularly disposed passageways formed therethrough and intersecting the axial bore. A plurality of jaws are also provided slidably positioned in each of the angularly disposed passageways, each of the jaws having a jaw face formed on one side thereof and threads formed on the opposite side thereof. A nut is also provided rotatably mounted relative to the body so as to engage the jaw threads. A generally cylindrical sleeve member is provided received over the forward section of the body for engaging the nut so that when the sleeve member is rotated, the nut will be rotated therewith to operate the jaws. A bearing member is received about the forward section of the body member and supporting the sleeve member rotatably thereon, and a retaining member is secured on the forward section of the body member for retaining the sleeve in place through the bearing member. In one preferred embodiment, the nut may be co-molded into the sleeve.

Other objects, features, and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
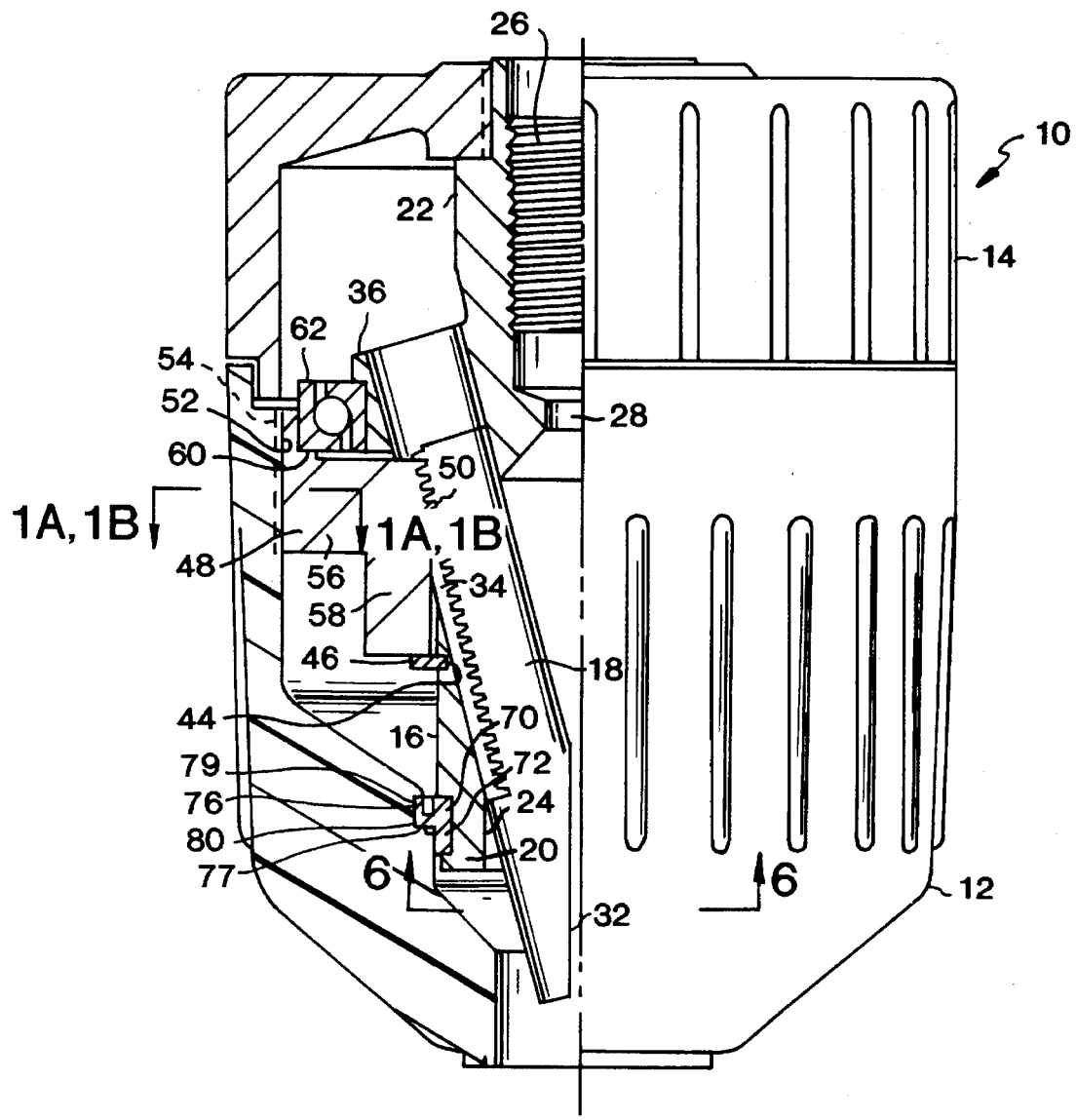
FIG. 1 is a longitudinal view, partly in section, of the chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
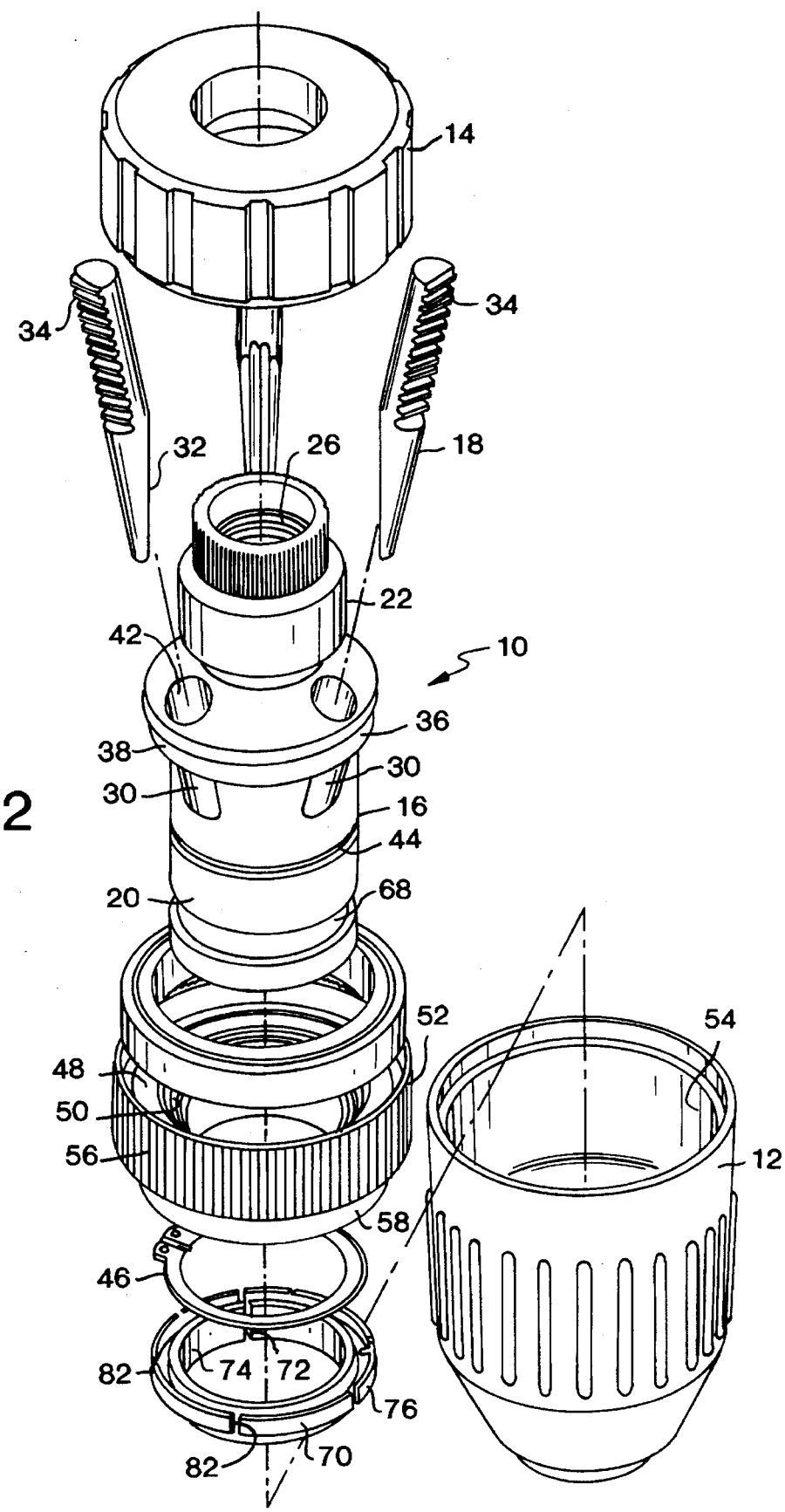
FIG. 2 is an exploded view of a chuck in accordance with the embodiment in FIG. 1.

Referring to FIGS. 1 and 2, a chuck 10 in accordance with the present invention is illustrated. Chuck 10 includes a front sleeve member 12, an optional rear sleeve member 14, a body member 16 and jaws 18. Body member 16 is generally cylindrical in shape and comprises a nose or forward section 20 and a tail or rearward section 22. An axial bore 24 is formed in the nose section 20 of the body member 16. Axial bore 24 is dimensioned somewhat larger than the largest tool shank that the chuck is designed to accommodate. A threaded bore 26 is formed in tail section 22 of body 16 and is of a standard size to mate with the drive shaft of a powered or hand driver (not shown). The bores 24, 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Three jaws 18 are employed and each jaw 18 is separated from the adjacent jaw by an arc of approximately 120 degrees. The axes of the passageways 30 and the jaws 18 are angled with respect to the chuck axis and intersect the chuck axis at a common point ahead of the chuck body 16. Each jaw 18 has a tool engaging face 32 which is generally parallel to the axis of the chuck body 16 and threads 34 on its opposite or outer surface. Threads 34 of any suitable type and pitch may be utilized within the scope of the present invention as would be readily apparent to one skilled in the art.

As illustrated in FIGS. 1 and 2, body member 16 includes a thrust ring member 36 which, in a preferred embodiment, may be integral therewith. In an alternate embodiment, thrust ring member 36 may be a separate component from the body member. Thrust ring member 36 may also include a ledge portion 38. Ledge portion 38 is adapted for engagement with a portion of a bearing assembly such as illustrated at 62 and as will be described in more detail below. Thrust ring member 36 includes a plurality of jaw guideways 42 formed around the circumference to permit retraction of the jaws 18 therethrough.

Body member 16 includes a rear cylindrical portion 22 with a knurled surface 46 thereon for receipt of optional rear sleeve 14 to be pressed thereon if so desired. It should be appreciated that rear sleeve 14 could also be retained in place by press fit without knurling or by use of a key. It could also be retained in place by crimping, staking, riveting, threading or any other suitable securing mechanism.

Body 16 further includes a groove 44 in the forward section. Groove 44 is adapted to receive a snap ring 46 or the like for retaining a nut in place as will be described in more detail below.

The present invention further includes a nut 48 which, in a preferred embodiment, is a one piece nut and which includes threads 50 for mating with threads 34 on jaws 18 whereby when nut 48 is rotated with respect to body 16, the jaws will be advanced or retracted. Nut 48 may include drive slots 52 for mating with drive ribs 54 on front sleeve 12 so that when front sleeve 12 is rotated, nut 48 will rotate therewith and move jaws 18 as set forth above.

Nut 48 includes a first portion 56 and a second portion 58 extending axially outwardly from the first portion, the second portion having an outside diameter less than the outside diameter of the first portion. Nut 48 also may include a ledge portion 60 (FIG. 1) that is configured to mate with a portion of a bearing such as 62. It should be appreciated that although an antifriction bearing 62 is illustrated, a plain or coated bearing surface or friction reducing washer could be utilized in place of bearing 62. In addition, a self-contained baring assembly could also be utilized.

Figure 1A:
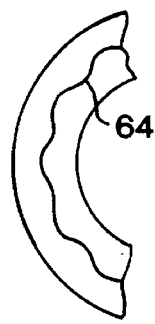
FIG. 1A is a sectional view of the embodiment of FIG. 1 taken along lines 1A—1A.
Figure 1B:
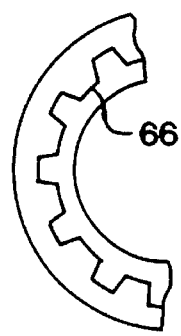
FIG. 1B is a sectional view of an alternate embodiment of the drive arrangement taken along lines 1B—1B of FIG. 1.

In a preferred embodiment as set forth above, front sleeve member 12 is adapted to be loosely fitted over nose section 20 of chuck 10. Multiple drive ribs 54 of front sleeve 12 engage drive slots 52 of nut 48 so that front sleeve 12 and nut 48 will be operatively connected, i.e., when front sleeve 12 is rotated, nut 48 will rotate therewith. Referring to FIGS. 1A and 1B, drive ribs 54 may extend in an arcuate manner as shown in FIG. 1A at 64 or in a substantially rectangular manner from said sleeve as illustrated in FIG. 1B at 66. The drive slots 52 on the nut 48 may be configured to generally conform to the configuration of the drive ribs on the sleeve.

Body member 16 may include an additional groove 68 on its forward section 20. A sleeve retaining snap ring 70 may be received in groove 68 for retaining front sleeve 12 in place. Referring to FIGS. 1 and 2, sleeve retaining snap ring 70 consists of a circular ring that is disconnected or broken along its circumference at 72. This disconnection allows snap ring 70 to fit into groove 68 on body member 16. Snap ring 70 includes a substantially circular first axial portion 74 adapted to be received in a groove 68 on body member 16. Snap ring 70 also includes a second substantially circular portion 76 extending from said first portion in an L-shaped manner (FIG. 1). Second substantially circular portion 76 includes a first portion 77 extending radially outwardly from first axial portion 74 and a second portion 79 extending axially outward from portion 77 in a cantilevered manner. Second portion 76 is flexible so that when said first portion 74 is received in groove 68 on body 16 and sleeve 12 is pressed over snap ring 70, a contact portion 78 of sleeve 12 will deflect second portion 76 to allow second portion 76 to be received in a groove 80 on sleeve 12. In this manner, sleeve 12 can be secured in place by snap ring 70. As can be appreciated, snap ring 70 is a one-way snap ring so that sleeve 12 is prevented from separating from the chuck. As illustrated in FIG. 1, a portion of sleeve 12 may bear against the outer surface of a section of portion 74 to provide additional rotational stability to the sleeve 12. It would be preferable in this instance for at least this portion of snap ring 70 to be constructed of a friction reducing material.

In a preferred embodiment, snap ring 70 is constructed of a polymeric material such as nylon and includes relief areas 82 to enhance the flexibility of portion 74. Of course, snap ring 70 could be constructed of any suitable single or composite material. As set forth above, rear sleeve member 14 is optional. If desired, rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16 while front sleeve member 12 is operatively associated with nut 48 and secured to body member 16 for relative rotation therewith. Relative movement of the front and rear sleeve members, 12 and 14, due to the interaction between threads 34 on jaws 18 and threads 50 on nut 48 causes jaws 18 to be advanced or retracted, depending upon the direction of relative movement.

Figure 3:
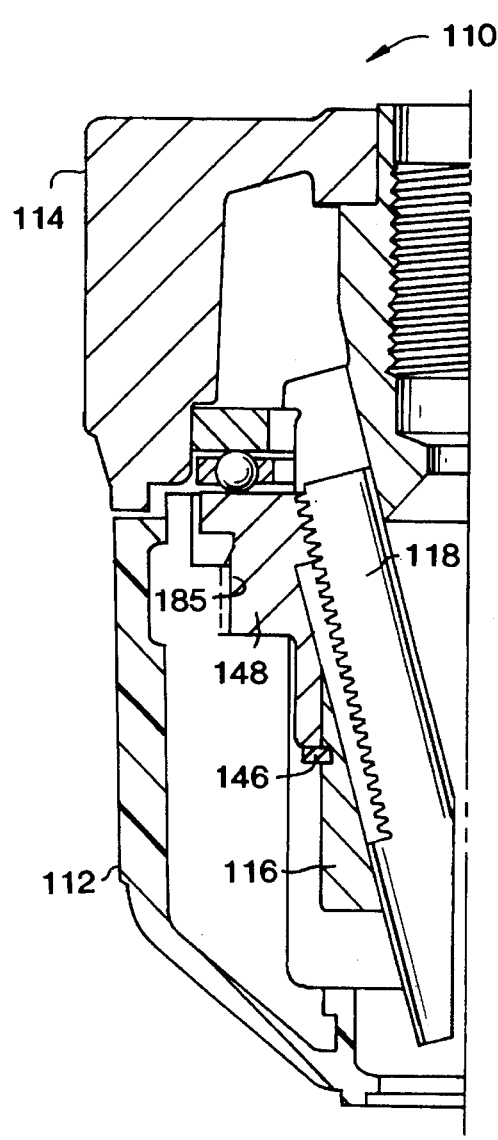
FIG. 3 is a longitudinal cross sectional view of a chuck in accordance with another embodiment of the present invention.

Referring to FIG. 3, another embodiment of a chuck in accordance with the present invention is illustrated at 110. This embodiment also includes a front sleeve 112 and an optional rear sleeve 114 both received on body member 116. The operation of the chuck as illustrated in the embodiment of FIG. 3 is the same as the embodiment of FIGS. 1 and 2 with respect to the interaction of the nut 148 with jaws 118, as well as retention of nut 148 in place by snap ring 146. The primary difference between the embodiment of FIG. 1 and 2 and the embodiment of FIG. 3 is that sleeve 112 is press fitted onto nut 148 to maintain sleeve 112 in place. This press fit arrangement also provides the drive engagement between front sleeve 112 and nut 148. Nut 148 may include a knurled portion 185 for engagement with outer sleeve 112 to prevent slippage upon rotation between sleeve 112 and nut 148. Of course, in the embodiment illustrated in FIG. 3, a sleeve retaining snap ring, such as 70 illustrated in FIG. 1, would not be necessary, but it should be appreciated that such could be utilized if desired.

Figure 4:
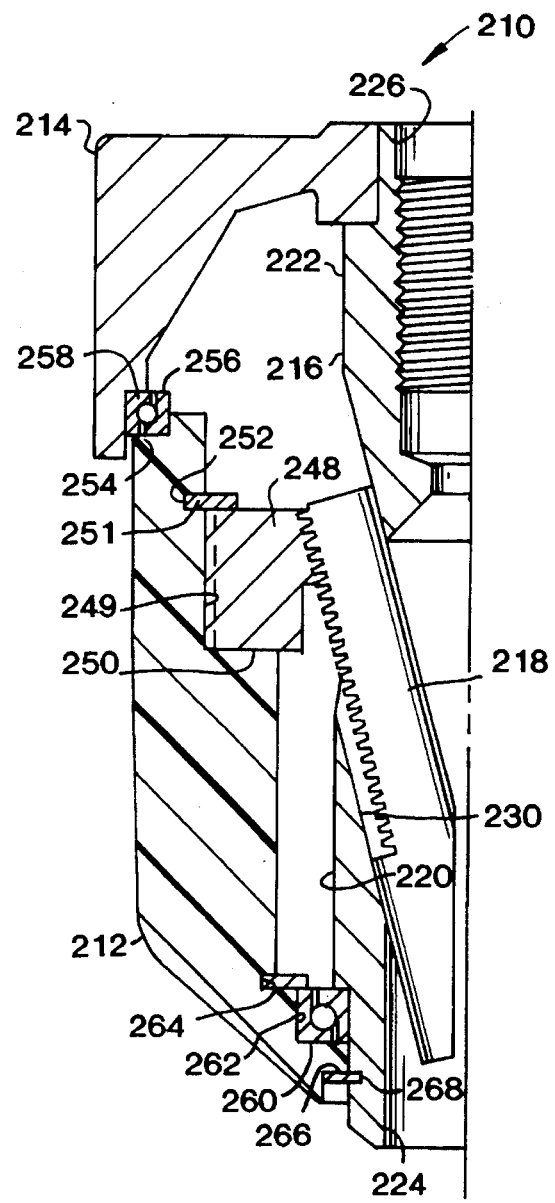
FIG. 4 is a longitudinal cross sectional view of a chuck in accordance with still another embodiment of the present invention.

Referring to FIG. 4, another embodiment of the chuck in accordance with the present invention is illustrated generally at 210. Chuck 210 includes body member 216, a front sleeve member 212 and a rear sleeve member 214. Body member 216 is generally cylindrical in shape and comprises a nose or forward section 220 and a tail or rear section 222. An axial bore 224 is formed in the nose section 220 of the body member 216. Bore 224 is configured in the same manner as bore 24 in the embodiment illustrated in FIGS. 1 and 2. The threaded bore 226 is formed in tail section 222 of body 216 in the same manner as illustrated with respect to FIGS. 1 and 2.

Passageways 230 are formed in body member 216 to accommodate each jaw 218, again in the same manner as set forth with respect to the embodiment of FIGS. 1 and 2.

Figure 4A:
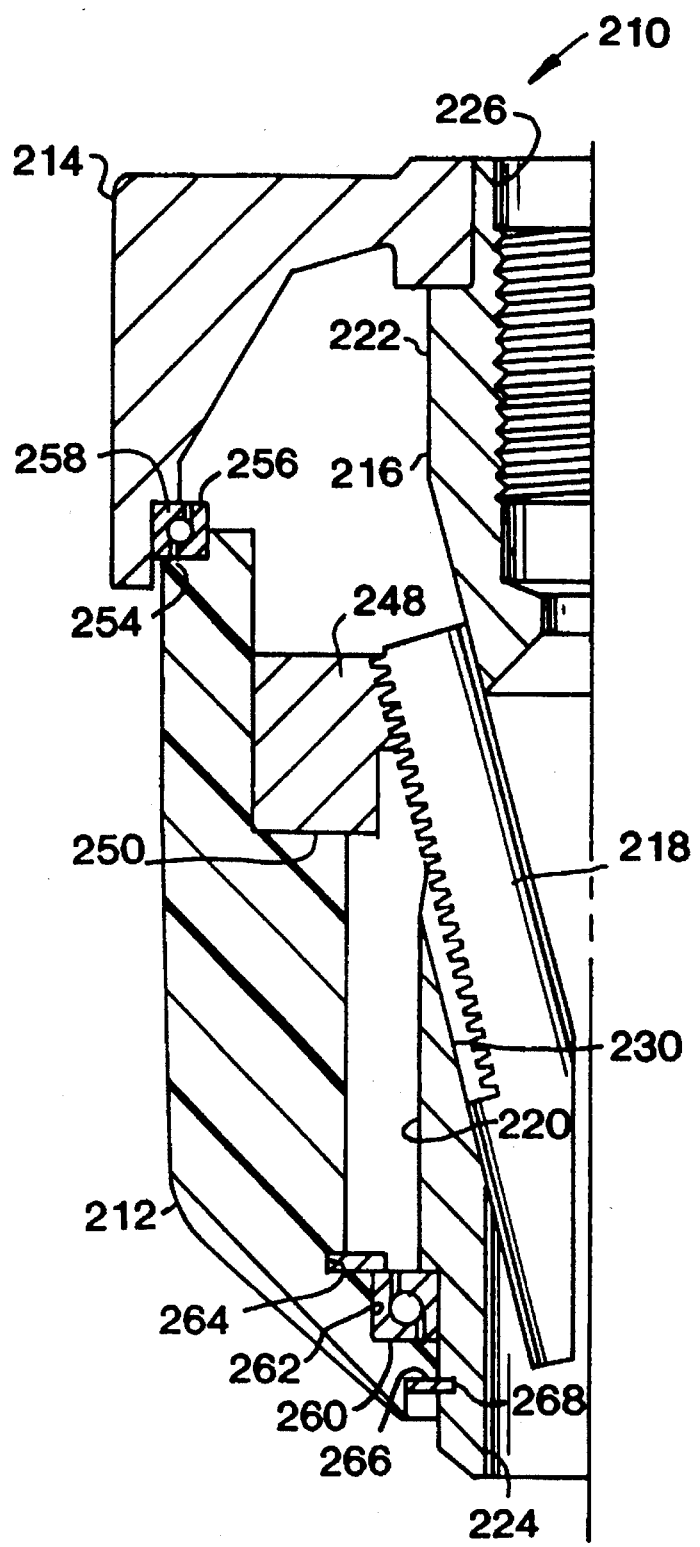
FIG. 4A is a longitudinal cross-sectional view of another embodiment of the present invention.

In the embodiment illustrated in FIG. 4, nut 248 (preferably unitary) may be received in a nut receiving portion 249 in sleeve 212. Nut receiving portion includes a ledge 250 to prevent movement of the nut in the forward direction, and a snap ring 251 is provided in a groove 252 in sleeve 212 to prevent rearward movement of nut 248. Any type interengaging mechanism between sleeve 212 and nut 248 to provide for rotational movement of nut 248 when sleeve 212 is rotated could be utilized including, for example, drive ribs and drive grooves as described with respect to the embodiment of FIGS. 1 and 2, or press fit as described with respect to the embodiment of FIG. 3. As illustrated in FIG. 4a, nut 250 could also be co-molded with sleeve 212.

Sleeve 212 further includes a rear ledge portion 254 adapted to engage a bearing member 256 which is received between ledge portion 254 and a ledge 258 on rear sleeve member 214. It should be appreciated that bearing member 256 can be any type known bearing member including, if desired, a coated or uncoated bearing surface, or a self-contained bearing assembly.

On the forward portion of sleeve 212 is another bearing receiving ledge 260 which receives a bearing member 262 which is retained therein by a retaining member 264. Again, it should be appreciated that bearing member 262 could be a coated or uncoated bearing surface or any suitable bearing member in accordance with the above discussions. Front sleeve 212 further includes a retaining ledge 266. The forward section of body member 216 includes a groove 268 therein for receipt of a retaining member such as a snap ring 270 or the like.

In operation, nut 248 is received in sleeve 212 and maintained in place by retaining member 251. Sleeve 212 is placed over the forward section of body member 216 and the rear portion of sleeve 212 engages a bearing member or bearing surface 256 which engages a portion of sleeve 214 thereon. In the forward section of sleeve 212 there is another bearing member or surface 262, and where such is a bearing member, it is retained in place by a retaining member 264. The entire sleeve is maintained in place in the forward direction by retaining member 270 which is received in groove 268 on the forward section of the body and in the rearward direction by ledge 258. It should be appreciated that bearing 262 may be press fitted onto the body and retaining member 270 may be optional.

Figure 5:
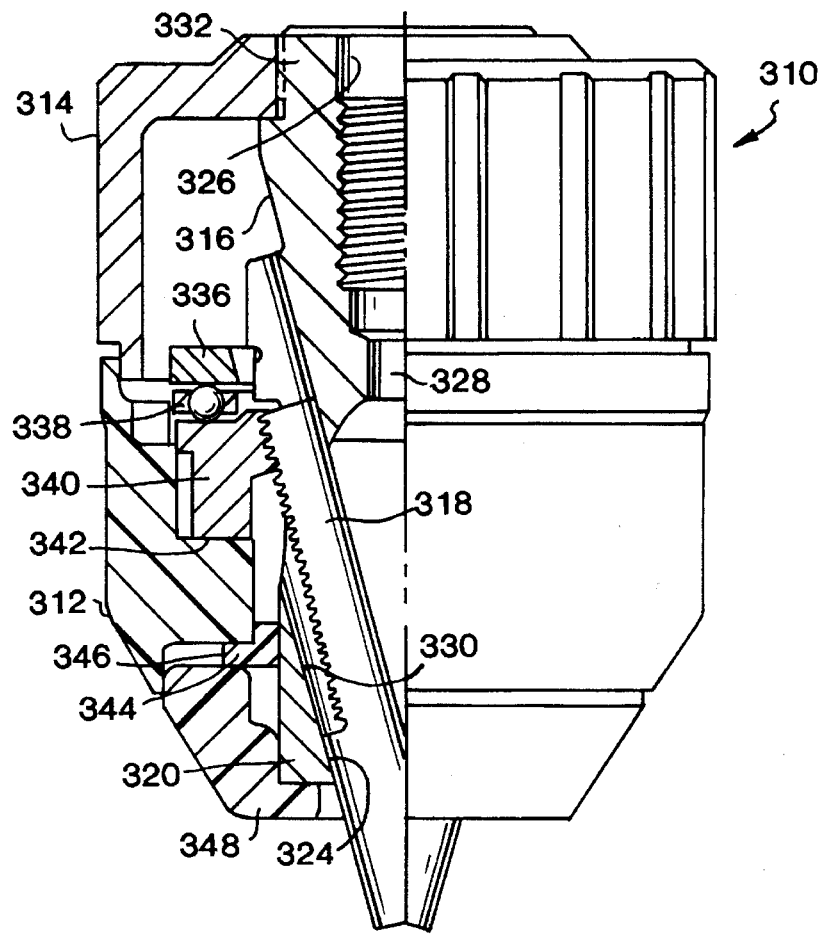
FIG. 5 is a longitudinal cross sectional view of another embodiment of the present invention.

FIG. 5 illustrates at 310 another embodiment of a chuck in accordance with the present invention. Chuck 310 includes a front sleeve member 312, an optional rear sleeve member 314, a body member 316 and jaws 318. Body member 316 is generally cylindrical in shape and comprises a nose or forward section 320 and a tail or rearward section 322. An axial bore 324 is formed in the nose section 320 of the body member 316, and a threaded bore 326 is formed in the tail section of body member 316 and is of a standard size to mate with the drive shaft of a power or hand driver (not shown). As discussed above with respect to the embodiments of FIGS. 1–4, the bores 324, 326 may communicate at a central region 328 of the body member 316.

Passageways 330 are formed in body member 316 to accommodate each jaw 318 as set forth with respect to the above embodiments. Body member 316 also includes a thrust ring portion 336. A bearing member 338 is received between thrust ring member 336 and a nut 340. While the bearing member 338 is illustrated, it should be appreciated that a coated or uncoated bearing surface could be utilized in place of the bearing member or a self-contained bearing assembly could be utilized. In a preferred embodiment, nut 340 is a one-piece nut and is prevented from forward movement by ledge 342 of sleeve 312. A bearing washer 344 is received about the nose section 320 of body member 316 and includes a ledge portion 346 which engages a forward portion of front sleeve 312. Member 344 may be plastic, nylon, teflon or any other suitable material and can, in general, be considered as a bearing washer to minimize friction when sleeve 312 is rotated.

A nosepiece 348 is received on the forward section 320 of body member 316 by means of a press fit or the like. The rearward portion of nosepiece 348 contacts the forward portion of member 344 so that sleeve 312 is maintained in place through member 344 by nosepiece 348 that is pressed onto the forward section of body member 316. It should be appreciated that while a one-piece nosepiece is illustrated at 348, such could be a multiple piece nosepiece or any other suitable retaining member.

In the embodiment illustrated in FIG. 5, nut 340 is maintained in place by nosepiece 348 through member 344 and sleeve 312. The operation of the chuck as illustrated in the embodiment of FIG. 5 is essentially as set forth with respect to the embodiment of FIGS. 1 and 2. Sleeve member 312 may have drive ribs and nut 340 may have drive rib receiving grooves so that when sleeve 312 is rotated, nut 340 will rotate therewith. In addition, sleeve 312 could be press fitted onto nut 340 or attached in any other suitable manner.

Figure 6:
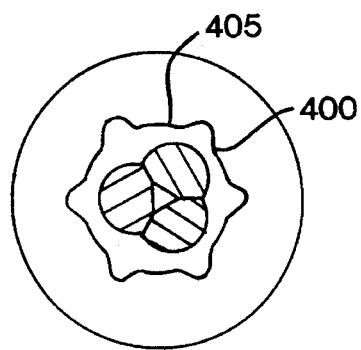
FIG. 6 is a frontal view of a chuck in accordance with an embodiment of the present invention.

FIG. 6 illustrates an alternate embodiment of the present invention. As illustrated in FIG. 6 at 400, the interior diameter of bore 405 in the forward section of the body may include a configuration such that a suitable tool may be utilized to rotate the body when the jaws are retracted into the chuck. Such a configuration may be such as a multi-sided star shape as illustrated in FIG. 6, or a polygonal shape or any other suitable shape with which a tool could be inserted so as to rotate the body member to screw the chuck body onto a driver spindle. In addition, the wrench configuration could be adapted into the outside diameter of the forward portion of the body member so that a suitable socket or other mechanism could be received over the nose section of the body member to rotate the chuck body to thereby tighten it onto a spindle or the like.

While the above description is set forth with respect to a keyless chuck, it should be appreciated that many of the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a unitary nut rotatably mounted relative to said body so as to engage said jaw threads;

a retaining member located on said body member, said retaining member located so as to contact a portion of said unitary nut to prevent axial movement of said nut in the forward direction, said retaining member being received in a groove in the forward section of said body; and a generally cylindrical sleeve member received over the forward section of said body for engaging said nut so that when said sleeve member is rotated, said nut will be rotated therewith to operate said jaws.

2. A chuck for use with a manual or powered driver as in claim 1, wherein said sleeve engages said nut through a press fit engagement.

3. A chuck for use with a manual or powered driver as in claim 1, and further including a bearing thrust ring located on said body member and at least one anti-friction bearing disposed between said nut and said thrust ring.

4. A chuck for use with a manual or powered driver as in claim 1, wherein said nut includes a first portion of a first outside diameter and a second portion extending axially outwardly from said first portion, said second portion having an outside diameter less than said first outside diameter.

5. A chuck for use with a manual or powered driver as in claim 1 further including a rear sleeve.

6. A chuck for use with a manual or powered driver as in claim 1, wherein said sleeve engages said nut through a loose fit engagement.

7. A chuck for use with a manual or powered driver as in claim 1, wherein one of said nut and sleeve includes ribs extending therefrom and the other of said nut and sleeve includes receiving portions thereon for receipt of said ribs in driving engagement therewith.

8. A chuck for use with a manual or powered driver as in claim 7, wherein said receiving portions are on said nut and extend through at least a portion of the outside diameter of the nut.

9. A chuck for use with a manual or powered driver as in claim 6, wherein said ribs extend in an arcuate manner from said sleeve.

10. A chuck for use with a manual or powered driver as in claim 6, wherein said ribs extend in a substantially rectangular manner from said sleeve.

11. A chuck for use with a manual or powered driver as in claim 1, and further including a sleeve retaining snap ring received on said body member and in engagement with said sleeve for retaining said sleeve on said body member.

12. A chuck for use with a manual or powered driver having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a unitary nut rotatably mounted relative to said body so as to engage said jaw threads;

a retaining member located on said body member, said retaining member located so as to contact a portion of said unitary nut to prevent axial movement of said nut in the forward direction;

a generally cylindrical sleeve member received over the forward section of said body for engaging said nut so that when said sleeve member is rotated, said nut will be rotated therewith to operate said wherein said nut includes a first portion of a first outside diameter and a second portion extending axially outwardly from said first portion, said second portion having an outside diameter less than said first outside diameter; and wherein said retaining member contacts said second portion of said nut.

13. A chuck for use with a manual or powered driver having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidable positioned in each of said angularly disposed passageways, each of said jaws having a jaw face formed on one side thereof and threads formed on the opposite side thereof;

a unitary nut rotatably mounted relative to said body so as to engage said jaw threads;

a retaining member located on said body member, said retaining member located so as to contact a portion of said unitary nut to prevent axial movement of said nut in the forward direction;

a generally cylindrical sleeve member received over the forward section of said body for engaging said nut so that when said sleeve member is rotated, said nut will be rotated therewith to operate said jaws;

and further including a sleeve retaining snap ring received on said body member and in engagement with said sleeve for retaining said sleeve on said body member; and wherein said sleeve retaining snap ring is a one way snap ring.

14. A chuck for use with a manual or powered driver as in claim 13, wherein said snap ring includes a substantially circular first axial portion adapted to be received in a groove on said body member and a substantially circular second portion extending from said first portion in an L-shaped manner, said second portion being flexible so that when said first portion is received in a groove on said body and a sleeve is pressed over said snap ring, a contact portion of said sleeve will deflect said second portion to allow said second portion to be received in a groove on said sleeve.

15. A chuck for use with a manual or powered driver having a rotatable shaft, said chuck comprising:

a generally cylindrical body member having a forward section and a rearward section, said forward section having an axial bore formed therein and a plurality of angularly disposed passageways formed therethrough and intersecting said axial bore in said forward section including a groove for receiving a sleeve retaining ring;

a plurality of jaws slidably positioned in each of said angularly disposed passageways, each of said jaws having a jaw face formed on one side thereof and threads formed on the opposite side thereof;

a nut rotatably mounted relative to said body so as to engage said jaw threads; and a generally cylindrical sleeve member received over the forward section of said body for engaging said nut so that when said sleeve member is rotated, said nut will be rotated therewith to operate said jaws, said sleeve member including a sleeve retaining ring groove defined therein; and a sleeve retaining snap ring, said sleeve retaining snap ring including a first substantially rigid portion received in said groove on said body member and a second flexible portion received in said groove in said front sleeve.

16. A chuck for use with a manual or powered driver as in claim 15, wherein the flexible portion of said sleeve retaining snap ring includes a first portion extending radially outwardly from said substantially rigid portion and a second portion extending axially outwardly from said radially outwardly extending portion in a cantilevered manner so that when a portion of said front sleeve contacts said flexible portion of said retaining snap ring, it will be deflected sufficiently to allow said flexible portion of said snap ring to be received within said groove of said front sleeve, the outer end of said axially extending portion contacting one inner portion of said sleeve groove to maintain said front sleeve in place.

17. A chuck for use with a manual or powered driver as in claim 15, wherein said sleeve retaining snap ring is a split ring.

18. A chuck for use with a manual or powered driver as in claim 15, wherein said second flexible portion is segmented to allow enhanced flexibility.

19. A chuck for use with a manual or powered driver as in claim 15, wherein a portion of said first substantially rigid portion and said second flexible portion form a U-shaped cross section, the open end of the U-shape extending in the rearward direction on said chuck body member.

20. A chuck for use with a manual or powered driver as in claim 15, wherein said snap ring is constructed of a polymeric material.

21. A chuck for use with a manual or powered driving having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a generally cylindrical sleeve member received over the forward section of said body, said sleeve member including a unitary nut retained therein so that when said sleeve is rotated, said nut will rotate therewith, said sleeve and nut being mounted relative to said body to engage said jaw threads;

said sleeve member further including a bearing member retained in the forward section of said sleeve and adapted to engage the forward section of said body member, said bearing member serving as a thrust bearing.

22. A chuck for use with a manual or powered driver as in claim 21, wherein said bearing member is pressed onto the forward portion of said body member to retain said front sleeve on the body member during operation of the chuck.

23. A chuck for use with a manual or powered driver as in claim 21, wherein said front sleeve is retained on said body member by a locking ring received in a groove on the forward section of the body member and engaging a portion of the front sleeve.

24. A chuck for use with a manual or powered driver as in claim 21, wherein said bearing member is retained in said sleeve by a locking ring.

25. A chuck for use with a manual or powered driver as in claim 21, wherein said unitary nut is retained in said sleeve by a locking ring received in a groove in said sleeve and abutting a portion of said nut.

26. A chuck for use with a manual or powered driver as in claim 21, and further including a rear sleeve fixed to the rearward section of the body member.

27. A chuck for use with a manual or powered driver as in claim 21, and further including a bearing member received between a rearward portion of said front sleeve and a forward portion of said rear sleeve.

28. A chuck for use with a manual or powered driver having a rotatable drive shaft, said chuck comprising:

a generally cylindrical body member, said body member having a forward section and a rearward section, said rearward section having an axial bore formed therein to mate with said drive shaft of said driver and said forward section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a nut rotatably mounted relative said body so as to engage said jaw threads;

a generally cylindrical sleeve member received over the forward section of said body for engaging said nut so that when said sleeve member is rotated, said nut will be rotated therewith to operate said jaws;

a bearing member received about the forward section of said body member and supporting said sleeve member rotatably thereon; and a retaining member secured on the forward section of the body member for retaining said sleeve in place through said bearing member.

29. A chuck for use with a manual or powered driver as in claim 28, wherein said sleeve is polymeric and said nut is co-molded into said sleeve.

30. A chuck for use with a manual or powered driver as in claim 28, wherein one of said sleeve and said nut includes drive ribs and the other of said sleeve and said nut includes drive rib receiving portions so that when said sleeve is rotated, said nut will rotate therewith to activate said jaws.

31. A chuck for use with a manual or powered driver as in claim 28, and further including a rear sleeve fixed to the rearward section of said body member.

32. A chuck for use with a manual or powered driver as in claim 28, and further including a thrust flange fixed on said body member and a bearing member located between a face of said nut and said thrust flange.

33. A chuck for use with a manual or powered driver as in claim 28, wherein said retaining member is a decorative nosepiece pressed onto the forward section of said body member.

34. A chuck for use with a manual or powered driver as in claim 28, wherein bearing member is a bearing washer.

* * * * *